(No Model.)

J. W. JANVIER.
FANNING MILL.

No. 306,621. Patented Oct. 14, 1884.

WITNESSES:
A. C. Eader
John E. Morris.

INVENTOR:
John W. Janvier
By Chas B. Mann
Attorney.

UNITED STATES PATENT OFFICE.

JOHN W. JANVIER, OF KENNEDYVILLE, MARYLAND.

FANNING-MILL.

SPECIFICATION forming part of Letters Patent No. 306,621, dated October 14, 1884.

Application filed June 17, 1884. (No model.)

*To all whom it may concern:*

Be it known that I, JOHN W. JANVIER, a citizen of the United States, residing at Kennedyville, in the county of Kent and State of Maryland, have invented certain new and useful Improvements in Fanning-Mills, of which the following is a specification.

My invention relates to a certain improvement in fanning-mills, and will first be described, and then designated in the claim.

Figure 1:
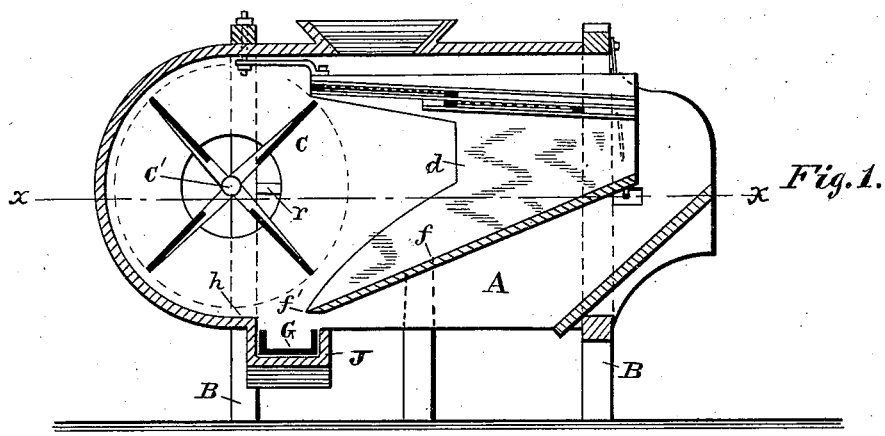
Figure 2:
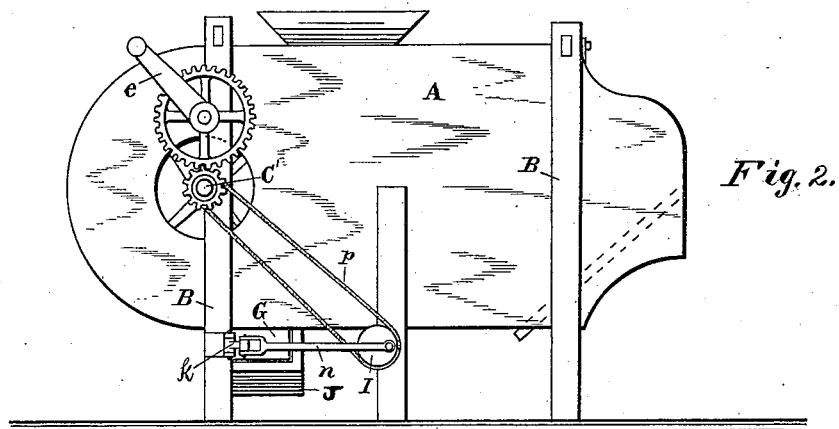
Figure 3:
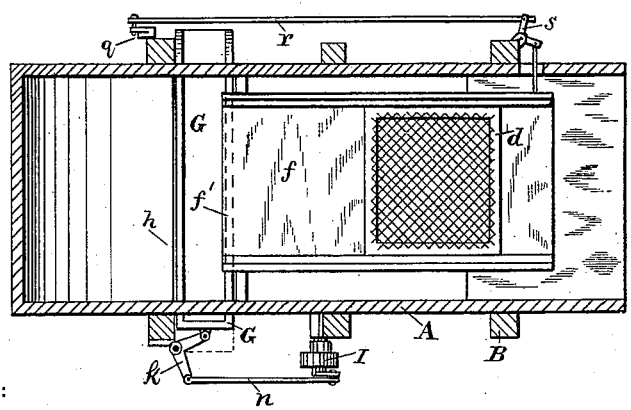

The invention is illustrated in the accompanying drawings, in which Figure 1 is a vertical longitudinal section. Fig. 2 is a side elevation. Fig. 3 is a longitudinal section of the casing on the line $x$ $x$, giving a top view of the riddle.

The casing A, uprights or supports B, fan C, the shaking riddle $d$, and the crank $e$, with its gearing, are of ordinary or may be of any suitable construction. The grain passes down the inclined bottom $f$ of the riddle, and extending crosswise and below the lower edge, $f'$, of the inclined bottom, is the sliding spout G. The sliding spout is open at the top, so that the grain passing off the lower edge of the incline enters the spout, which, as seen in Fig. 3, extends entirely across the case of the machine. The grain is thus delivered at the side of the machine, where it may be conveniently bagged. The spout is also below and extends crosswise of the bottom $h$ of the fan-concave, whereby any grain that may get into the concave will be delivered into the spout. In this low-down position the spout can have but little inclination, as it is necessarily near the floor. It would be very inconvenient for a machine of this kind to stand any higher from the floor, on account of the greater difficulty of supplying the grain in the top, and also on account of the height of the crank $e$, which should be just high enough from the floor to be conveniently turned by a man of average height. As the spout, from its location in this machine, cannot have much inclination, I provide for giving it a sliding back-and-forth movement, and connecting the mechanism which imparts this movement with the mechanism that shakes the riddle. A fixed trough, J, open at the ends, is located below the bottom $h$ of the fan-concave, and is attached thereto. The spout G occupies and snugly fits within this fixed trough, which, besides serving as a bearing or slide for the spout, prevents any grain from passing through to the floor.

A crank-pulley, I, has bearings at the side of the machine. A bell-crank lever, $k$, has one arm attached to the sliding spout G, and a rod, $n$, connects the other arm with the crank on the pulley I, and a belt, $p$, (see Fig. 2,) passes over the crank-pulley and also over a pulley on the fan-shaft C', at the opposite end of which is a crank, $q$, rod $r$, and bell-crank lever $s$, whereby the riddle is shaken. By this mechanism the vibrating inclined bottom $f$ delivers the grain from its lower edge into the spout, and the latter, by its slight inclination and sliding back and forth, shakes the grain out.

Sliding spouts are not new, and are not here broadly claimed; but I do claim the combination, as here shown, of the sliding spout occupying the fixed trough, and arranged with respect to the other parts as specified.

Having described my invention, I claim and desire to secure by Letters Patent of the United States—

The combination of the fan-concave, having a fixed trough, J, extending crosswise and below its bottom $h$, a spout, G, occupying the trough and adapted to slide back and forth, shaking riddle $d$, having an inclined bottom, $f$, with its lower edge, $f'$, above the said spout, and mechanism, substantially as described, to move the spout and shake the screen, as set forth.

In testimony whereof I affix my signature in presence of two witnesses.

JOHN W. JANVIER.

Witnesses:
 JOHN E. MORRIS,
 JNO. T. MADDOX.